(12) United States Patent
Jones

(10) Patent No.: X9697
(45) Date of Patent: Jun. 2, 1836

(54) STOVES, ANTHRACITE COAL

(76) Inventor: Adrian Jones

Adrian James. Hartford Ct.
Letters Patent.

The Schedule referred to in these Letters Patent and making part of the same containing a description in the words of the said Adrian James himself of his improvement in the Stove for burning Anthracite or hard coal To all whom these presents shall come Greeting
Be it known that I Adrian James of Hartford in the County of Hartford and State of Connecticut have invented a new and useful improvement in Stoves for burning Anthracite or hard coal: and the following is a full and exact description of the construction and operation of the said Stove as improved by me and which may be denominated a return draft Stove. Take a common upright Cylindrical Sheet Iron Stove of any convenient size and height according to the space to be warmed. For general use say for a more definite description take one constructed as follows. One Cylinder twelve inches in diameter and twenty eight inches high one do nine inches in diameter and eighteen inches high and one six inches in diameter and twelve inches high and these three sizes being placed on each other the largest on the hearth of the stove or at the bottom and the smallest on the top may be called the first second and third Stories. It being immaterial however except for beauty whether it is of this form or of the same size from the bottom to the top. Place within the first or lower story a second or inner Cylinder ten inches in diameter of the same length with the outer one and coming in contact with it on the front or outer side. thereby leaving a space between the two Cylinders opposite the door of about two inches which space will of course diminish in its sectional area until it terminates in a point on each side where the two Cylinders come in contact. The top of the inner cylinder should then be pared or sloped off from
the back of it to the centre of its circumference on each side at an
angle of not less than ninety degrees. The portion of the inner cylin-
der so sloped should be covered with a Cap or Roof the front of which
will be a straight line and should be extended each way in a[illegible] line
to the outer Cylinder.

A small space will still remain open at the top between the
two Cylinders from the points of s.d Cap or roof at each end of
the point where said Cylinders come in contact. This opening
must be closed with a piece of sheet Iron or other suitable metal
connected to both the inner and outer cylinders and to the ends of
said Cap or roof so as in conjunction with the partition hereaf-
ter described to cut off all communication between the inner
Cylinder and the space back of it between the two Cylinders ex-
cept over the top of said partition To the front or straight edge of said Cap or Roof is to be attached
and secured a piece of sheet iron extending upward through the sec-
ond and third stories of said Stove to within about three inches of
the top which is also to be fastened to the Stove on each side of it and
will thus form a perpendicular Partition dividing the inside of the said
Stove from said Cap or roof into two equal parts to the heigth of said
partition — The grate and fire brick are to be placed in the inner
Cylinder and there may be two doors both which must be cut through
the two Cylinders where they come in contact. The upper for supplying
coal. the lower for draft and if a Basket grate is used to shew the
fire also. An opening for the smoke pipe should be cut through the
outer Cylinder only and on the back of it say ten inches from the
hearth or bottom of the Cylinder. And I have found it benefi-
cial to place a piece of sheet Iron horizontally between the two Cylinders im-
mediately above the opening for the smoke pipe in such a way
as nearly to close up the whole space between the two Cylinders
for a distance of not less than twice the diameter of the smoke-
pipe. By this means all the heated air which must of course ascend in front of the partition pass over it and descend behind it and between
said two Cylinders is driven as near as possible to the bottom of the
Stove before it escapes through the aforesaid pipe
An opening should then be made through the inner cylinder
on the back of it between the Grate and the hearth or bottom
of the Stove for the dust and light ashes to pass off into the smoke
pipe when the fire is agitated or stirred. The opening may be
two inches in length by four in width and should be tight
closed by a damper except when the fire is agitated to separate
the ashes from the coal. The damper may be attached to a
wire passing horizontally through the outer Cylinder beneath the
smoke pipe and at right angles therewith or by a wire pass-
ing perpendicular through the space between the two cylinders &
coming out behind the second story of the Stove. The Stove
when placed on a cast iron hearth has all the external appearance
of a common upright cylindrical sheet iron Stove except the
location of the pipe and this may be varied as convenience requires.
The above description corresponds with the stove as used by me
but the dimensions of the Stove and the corresponding parts may
be indefinitely varied. The Stove may also be square elliptical
Octagonal or any other form in its cross section as well as
cylindrical and may be made of cast as well as sheet Iron
By means of my improvement among other things the outer
Cylinder of the Stove is defended from that intense heat which
always destroys the Solder and frequently the material of the Stove
The heat is also detained within the Stove for so long a period
and so diffused around the outer Cylinder as nearly to expend
itself before the current reaches the smoke pipe and thereby ren-
ders any great length of pipe wholly unnecessary.
The opening for the dust and light ashes being so intimately
connected with the principal draft of the Stove through the smoke
pipe they are effectually carried off and from the location of
the pipe it may be inserted into any common fire place with but little expense or inconvenience. — I do not claim as my
invention the above described Stove or any of its parts taken singly
or the materials of which they are composed. But I do claim
the combination of the inner cylinder and partition (together with
the mode of bringing the heated air into the bottom of the cylinder
before it passes off) with the common Stove as heretofore used by
the public.

Signed at Hartford Conn. this 1st day of January 1836

Witnesses
Th. J. Williams
Francis Parsons

Adrian Janes

[illegible]
[illegible]

1224 [illegible]